United States Patent [19]

Amelio

[11] 3,866,067

[45] Feb. 11, 1975

[54] CHARGE COUPLED DEVICE WITH EXPOSURE AND ANTIBLOOMING CONTROL

[75] Inventor: Gilbert F. Amelio, Saratoga, Calif.

[73] Assignee: Fairchild Camera and Instrument Corporation, Mountain View, Calif.

[22] Filed: May 21, 1973

[21] Appl. No.: 362,131

[52] U.S. Cl. .............. 307/311, 250/211 J, 307/304, 357/24, 357/30

[51] Int. Cl. .............................................. H01l 17/00

[58] Field of Search .................. 317/235 G; 357/24; 307/221 D, 304, 311; 250/211 J

[56] References Cited

UNITED STATES PATENTS 3,771,149 11/1973 Collins et al. ....................... 317/235

OTHER PUBLICATIONS

The Bell System Technical Journal, "Blooming Suppression in Charge Coupled Area Imaging Devices" by Sequin, Oct. 1972, p. 1923–1926.

*Primary Examiner*—Stanley D. Miller, Jr.
*Assistant Examiner*—William D. Larkins
*Attorney, Agent, or Firm*—Norman E. Reitz; Alan H. MacPherson; Roger S. Borovoy

[57] ABSTRACT

The charge generated in a light sensing element in semiconductor material by incident radiation is transferred to a charge sink by lowering the potential in the semiconductor material between said light sensing element and the charge sink. When it is desired to accumulate charge in the light sensing element for some purpose, the potential in this intermediate region of semiconductor material is raised to prevent the flow of additional charge to the charge sink region. By adjusting the potential on this intermediate region, a given amount of charge can be allowed to accumulate in the light sensing element while at the same time any additional charge can be allowed to transfer to the charge sink region. The charge packet generated in the light sensing element is read out of the light sensing element in the normal manner.

2 Claims, 7 Drawing Figures

CHARGE COUPLED DEVICE WITH EXPOSURE AND ANTIBLOOMING CONTROL

BACKGROUND OF THE INVENTION

1. Field of the Invention

This invention relates to charge coupled devices and in particular to charge coupled device structures wherein the light sensing elements are prevented from saturating by allowing excess charge to be removed from the elements before the elements saturate, and the method of operating such structures.

2. Prior Art

In a charge coupled device (hereinafter referred to as a CCD) photo charge generated by incident light is stored in potential wells near the surface of the device. The semiconductor material in which one packet of charge is generated by incident light, together with the overlying insulation and electrode, is called a "photosensor" or alternatively, a "light sensing element." The stored charge comprises minority carriers relative to the conductivity type of the predominant impurity in the substrate containing the potential wells. The potential wells are localized beneath an optically transparent electrode and are bounded on two of their four sides by so-called channel stop diffusions, on the other two sides parallel to the surface by a gated CCD analog shift register and by a third channel stop diffusion, on their top by insulation and on their bottom by semiconductor material. In the axis perpendicular to the semiconductor surface, the potential well is formed by the parabolic potential profiles formed by the field lines terminating on the donors and acceptors in the implanted layer for buried channel structures (or surface region of the semiconductor material when a buried channel is not used) and the semiconductor material, respectively. When this three-dimensional well becomes saturated with charge, charge carriers will flow away from the desired assembly point in the light sensing element and "blooming" will occur. "Blooming" is defined as the spreading of the charge originally accumulated in a light sensing element in such a way as to interact with charge accumulated in adjacent light sensing elements.

SUMMARY OF THE INVENTION

This invention provides structure for preventing the occurrence of blooming by draining off the excess charge carriers from a potential well just before that well saturates and also for controlling the exposure time during which the potential well accumulates charge.

In accordance with this invention, a light sensing element in a CCD structure is separated from a charge sink region in the semiconductor material by a potential barrier. The potential barrier is periodically lowered to allow charge generated in the light sensing element to transfer to the charge sink area. During the time that charge is to accumulate in the light sensing element in response to incident radiation such as light, the potential barrier between the charge sink and the light sensing element is raised. The charge accumulated in the light sensing element is then transferred from the light sensing element to another region of the semiconductor material which is part of a transport array. The gating of the charge from the light sensing element to the transport array can occur either by use of a separate transfer gate or by use of a transfer gate-less structure of the type disclosed in co-pending application Ser. No. 357,760 filed May 7, 1973 by Gilbert F. Amelio entitled "Transfer Gate-less Phtosensor Configuration."

Alternatively, the potential barrier between the light sensing element and the charge sink is fixed at a level selected to allow excess charge in the potential well above a given amount to transfer to the charge sink rather than to adjacent light sensing elements. This prevents the so-called "blooming" phenomenon.

DETAILED DESCRIPTION

While the structure and method of this invention will be described in conjunction with charge coupled devices formed in silicon semiconductor material, it should be understood that this invention can be implemented using any other material with which charge coupled devices can be formed. Furthermore, while this invention will be described as using a silicon substrate of P type conductivity, it should be understood that this invention can also be formed using opposite conductivity type material.

Figure 1A:
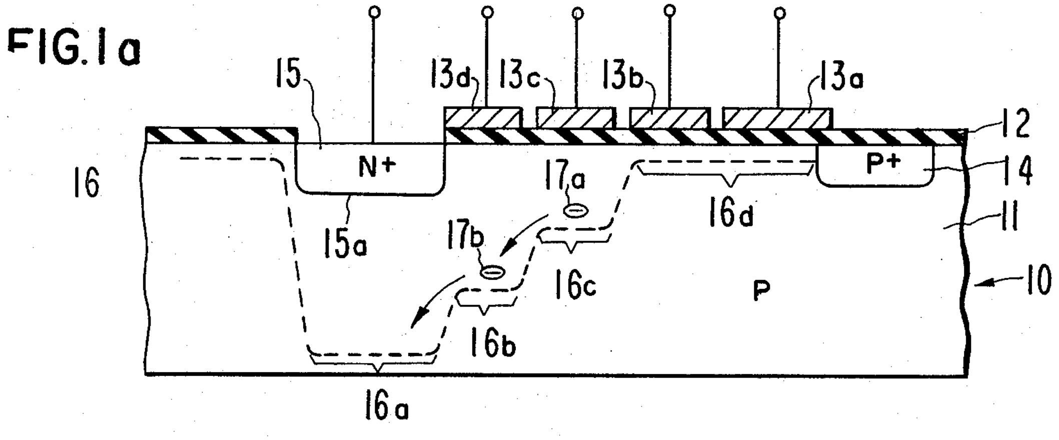
FIGS. 1*a*, 1*b*, 1*c* and 1*d* show in cross-section one light sensing element and the associated exposure control gate, sink region, photo gate, transfer gate and transport gate overlying but insulated from a substrate of semiconductor material with various potentials formed in the regions of semiconductor material beneath the various gates thereby to illustrate the operation of one embodiment of this invention.
Figure 1B:
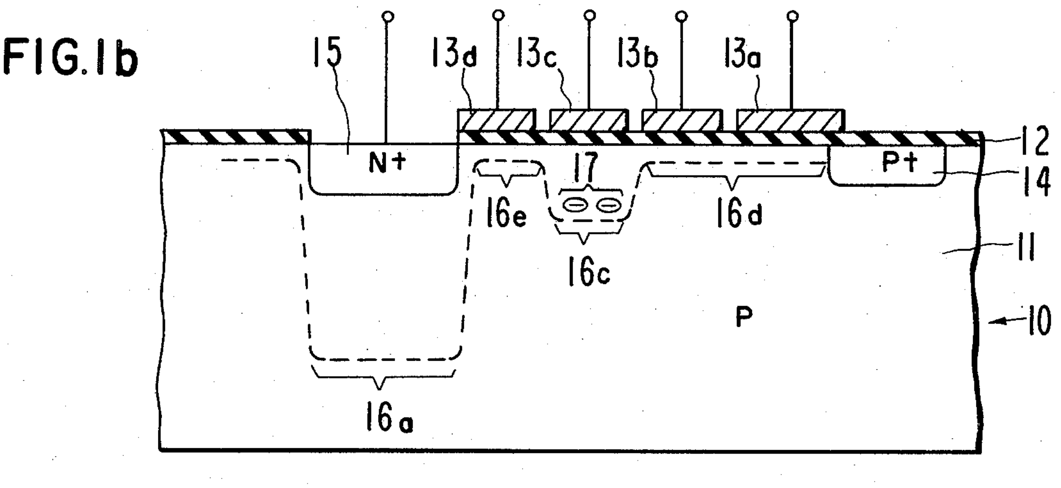
Figure 1C:
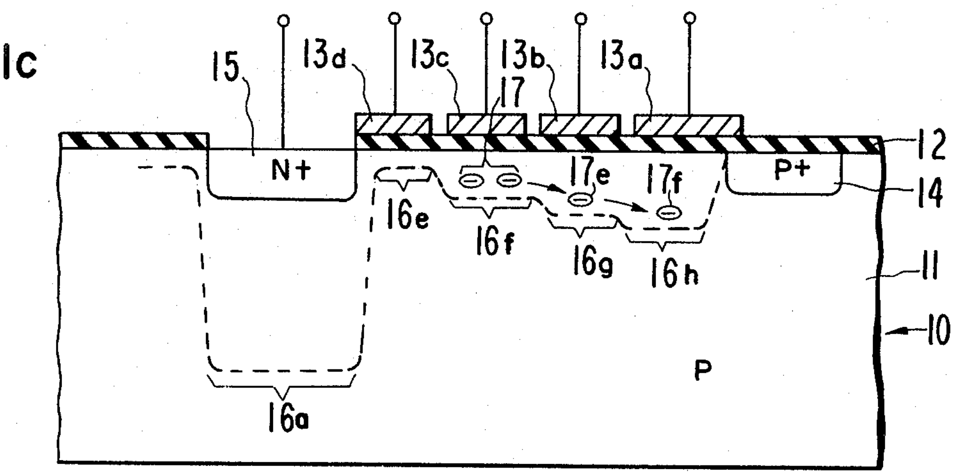

As shown in FIG. 1*a*, wafer 10 comprises a P type silicon substrate 11 on which is formed insulation 12. Typically, insulation 12 comprises a layer of silicon dioxide although other materials can also be used for this insulation if desired, or alternatively, this insulation can consist of several insulating materials. Typically, insulation 12 must be transparent at least to the incident radiation desired to generate the charge in the portion of substrate 11 contained in the light sensing element.

Several conductive gates are formed on the top surface of insulation 12. The potential in the region of semiconductor material beneath each gate is varied by varying the potential on that gate. Transport gate 13a controls the transport of charge from the array (either linear or area) to utilization structures outside the semiconductor die containing the light sensing element. Transfer gate 13b controls the transfer of charge from the light sensing element to the region in the transport array beneath transport gate 13*a*. Photogate 13*c* is part of the light sensing element and controls the potential in the region of semiconductor material 11 directly beneath photogate 13*a*. Exposure gate 13*d* controls the potential between the region of semiconductor material in the light sensing element beneath photogate 13*c* and a charge sink. Typically, the charge sink comprises a reverse-biased diode consisting of region 15 of N+ type conductivity separated from P type material 11 by PN junction 15*a*. The structures shown in FIGS. 1*a* through 1*d*, 2*a* and 2*b* are identical and differ only in the potentials formed in regions of semiconductor material 11. In these FIGURES the potentials are represented by potential lines 16 and the potentials in various regions of semiconductor substrate 11 are represented by sections of line 16 denoted by the number 16 followed by a letter. A given potential associated with a given region in substrate 11 bears the same number and letter in the different FIGURES.

The operation of this invention will now be described in conjunction with the variation of potentials on the various gates 13*a* through 13*d* to obtain electronic exposure control. Because in the structure shown the minority carriers generated by incident radiation are electrons, a rise in potential corresponds to a drop in voltage and vice versa.

FIG. 1*a* shows the photosensing element prior to the detection of the amount of incident radiation. The potentials on the various gates are arranged such that the potential in the semiconductor material in which the diode is formed (i.e., the potential in N+ region 15) is low as represented by line section 16*a*. The potential on exposure gate 13*d* is above the potential of diode 15 as represented by line section 16*b*. The potential in the semiconductor material beneath photogate 13*c* is at the higher level represented by line section 16*c*. Thus electrons 17*a* transfer from beneath photogate 13*c* to beneath exposure gate 13*d* and then to diode 15. The potential in the semiconductor material beneath transfer gate 13*b* and transport gate 13*a* is above that beneath photogate 13*c* as shown by dashed line section 16*d*. Dashed line section 16*d* terminates in a channel stop region of P+ type semiconductor material 14.

When the potentials are distributed in the semiconductor material as shown in FIG. 1*a*, the light sensing element is said to be in stand-by and any charge generated in the semiconductor material beneath photogate 13*c* is transferred to sink diode 15.

When it is desired to integrate the charge generated by incident radiation, the potential in the semiconductor material beneath exposure gate 13*d* is raised to the position shown by dashed line 16*e* (FIG. 1*b*) by raising the potential (i.e., lowering the voltage) on gate 13*d*. All other potentials throughout the semiconductor material remain essentially the same. Light incident on the semiconductor material in the region beneath photogate 13*c* then generates charge represented by electrons 17 in the potential well represented by dashed line section 16*c*. The electrons generated in this potential well remain beneath photogate 13*c* due to the potential barrier represented by dashed line section 16*e* and dashed line section 16*d*.

At the end of the exposure, the charge generated beneath photogate 13*c* is transferred to the region of semiconductor material beneath transport gate 13*a*. This is done by raising the potential of the semiconductor material beneath photogate 13*c* to the position shown by dashed line 16*f* (FIG. 1*c*), lowering the potential of the semiconductor material beneath transfer gate 13*b* to the position shown by dashed line section 16*g*, and lowering even more the potential of the semiconductor material beneath transport gate 13*a* to the position represented by dashed line section 16*h*. The potential on exposure gate 13*d* is maintained so as to keep the potential in the semiconductor material beneath this gate at the level represented by line section 16*e*. The charge 17 previously generated in the potential well beneath photogate 13*c* transfers to the region of semiconductor material beneath transport gate 13*a*.

Figure 1D:
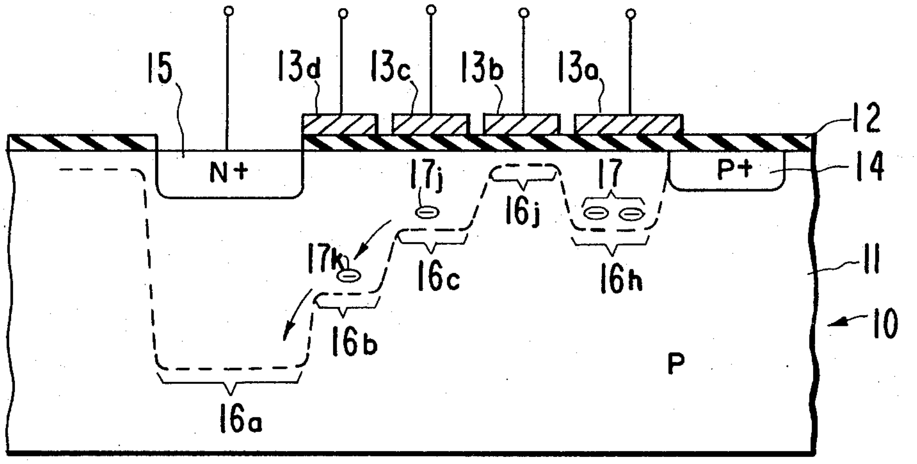

The charge 17 beneath transport gate 13*a* (FIG. 1*d*) is retained in that position by raising the potential on electrode 13*b* and thus in the semiconductor material beneath electrode 13*b* to the level shown by dashed line section 16*j* (FIG. 1*d*). At the same time, the potential of the semiconductor material beneath electrode 13*c* is lowered to the position represented by dashed line section 16*c* and the potential of the semiconductor material beneath exposure gate 13*d* is dropped to a still lower position as shown by dashed line section 16*b* (FIG. 1*d*). Thus charge 17*j* generated beneath photogate 13*c* is transferred immediately to the charge sink comprising N+ type semiconductor material 15. Simultaneously, the charge 17 previously transferred to beneath transport gate 13*a* remains beneath transport gate 13*a* waiting to be removed from the semiconductor substrate 11.

Figure 2A:
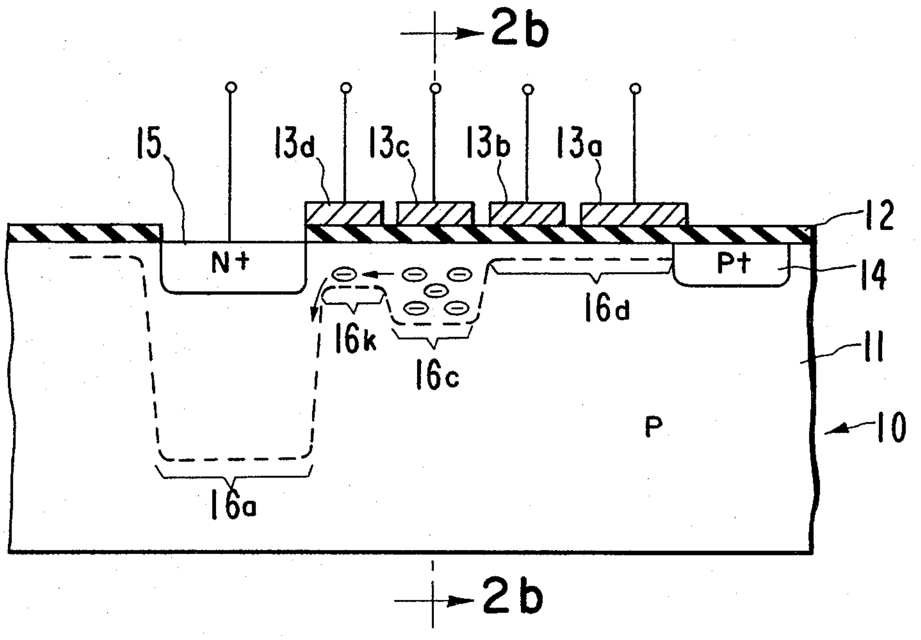
FIGS. 2*a* and 2*b* show the operation of the structure shown in FIGS. 1a through 1d in what is known as the "anti-blooming" mode.

FIG. 2*a* shows the exposure control structure of FIGS. 1*a* through 1*d* operating in the "anti-blooming" mode. In this mode charge is allowed to accumulate to a certain level in the potential well represented by dashed line section 16*c* (FIG. 2*a*) beneath photogate 13*c*. The potential of the semiconductor material beneath exposure gate 13*d* is held at a level above that beneath photogate 13*c* as shown by the dashed line section 16*k*. However, the potential beneath exposure gate 13*d* is slightly beneath the potential beneath the transfer gate 13*b*. Thus the potential well beneath the photogate will hold a certain amount of charge. However, any additional charge above the capacity of the well is not retained in the well but rather is transferred to the sink diode. This charge does not transfer to the adjacent light sensing elements because of the higher potential surrounding the potential well created by the high potential on transfer gate 13*b* and higher conductivity regions 18*c* and 18*d* (FIG. 2*b*).

Figure 2B:
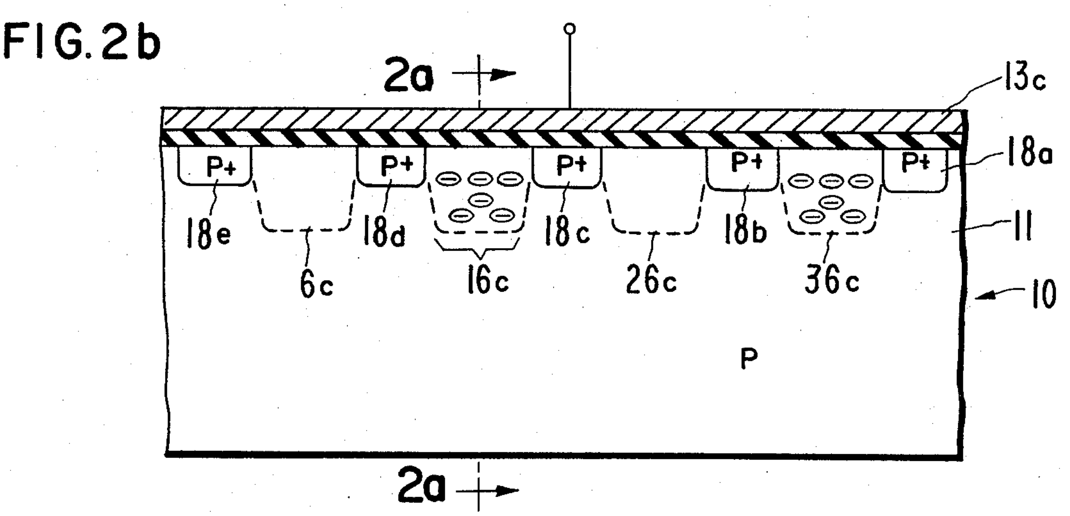

FIG. 2*b* shows the structure of FIG. 2*a* taken in a cross-section along the photogate electrode 13*c*. This structure shows the charge accumulated in potential wells 16*c* and 36*c* taken longitudinally along the photogate electrode 13*c* while at the same time no charge is allowed to accumulate in the alternate potential wells 6*c* and 26*c*. Thus during the period that the charge is being transferred from potential wells 16*c* and 36*c* to a transport array (of which only transport gate 15*a* is shown in FIG. 2*a*) and along the transport array to outside the device, the potential on the exposure gates associated with potential wells 16*c* and 36*c* can be adjusted to allow charge to accumulate in those portions of the image array. Thus the transport array can be used to transfer from the array charge generated in every other potential well along one linear array while charge is being generated in the other potential wells along the array. This structure thus is particularly useful in a two-phase operation of the type described in the above-mentioned co-pending application of Amelio.

It should be noted that the presence of exposure gate 13*d* (FIGS. 1*a* through 1*d* and FIG. 2*a*) allows the exposure time of a given photosensing element to be controlled. The exposure time can be varied as a function of the intensity of incident radiation and thus the dynaminc range of a given light sensing element can be dramatically changed in accordance with the intensity of the impinging radiation. This allows a given light sensing element, and the linear or area array of which it is a part, to be used in a wide variety of applications without any structural or other modification. Thus with exposure control, the integration time can be varied as required. Without exposure control the integration time is equal to the total device scanning period. Therefore a wide range of light intensity can be handled by using the structure of this invention without saturating the light sensing elements.

In the blooming control mode of operation, the exposure gate such as gate 13*d* is turned on just slightly (i.e., its potential is dropped beneath that of transfer gate 13*b*) so that excessive carriers are drained to the sink diode 15 instead of filling the adjacent light sensing element (such as element 6*c* or 26*c* in FIG. 2*b*). Thus the potential wells under the photogate are never permitted to fully saturate and blooming cannot occur. In this way, an image with a contrast range far exceeding the dynamic range of the device can be handled without destroying resolution.

Figure 3:
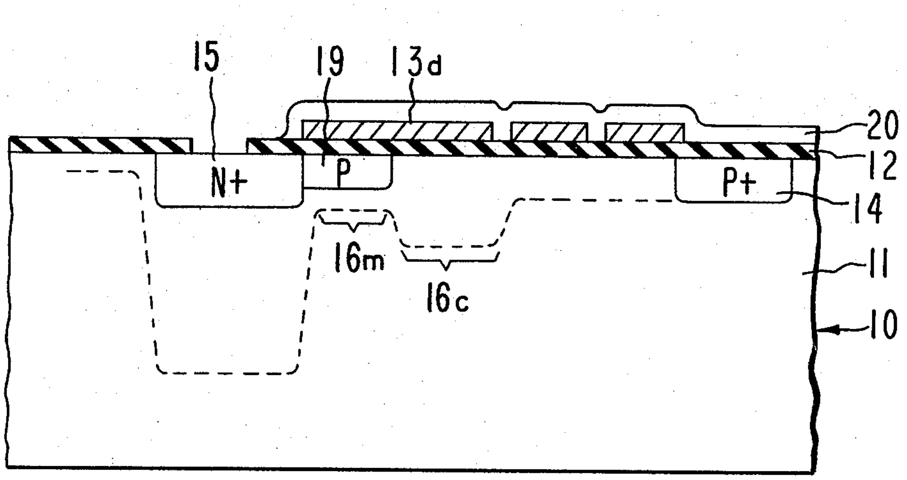
FIG. 3 shows an embodiment with antiblooming but without an exposure gate.

The structure shown in FIGS. 1*a* through 1*d* and 2*a*, 2*b* is essentially an active structure in that the exposure control is achieved with external voltages. A passive structure can be obtained by replacing the exposure gate 13*d* with a region of higher conductivity than, but of the same conductivity type as, semiconductor substrate 11. Such a region is shown in FIG. 3. There substrate 11 has formed in it P type region 19 of higher conductivity than, but of the same conductivity type as, substrate 11. The potential represented by dashed line section 16*m* in the semiconductor material beneath P type region 19 is fixed at a level above the potential shown by dashed line 16*c* in the semiconductor material beneath photogate 13*c* but beneath the maximum level to which that potential and the potential beneath transfer gate 13*b* can be raised by lowering the voltages on photogate 13*c* and transfer gate 13*b*. Electrode 13*c* extends over P region 19 to ensure that the potential of the semiconductor material beneath region 19 is always a substantially fixed amount above the potential in the semiconductor material beneath that portion of electrode 13*c* not over region 19. Thus the structure shown in FIG. 3 operates in the anti-blooming mode but at the same time does not have the versatility which the structure shown in FIG. 1*a*, for example, has due to the possibility of varying the voltage applied to exposure gate 13*d*. In FIG. 3, the impurity concentration in regions 19 and the adjacent portions of substrate 11 determine the relative heights of potentials represented by lines 16*m* and 16*c*. As in the structure of FIG. 2*a*, excess carriers spill over from the potential well 16*c* to sink diode 15. But while the structure of FIG. 3 uses an implanted asymmetrical potential to achieve anti-blooming control, variable exposure control cannot be accomplished.

The structure shown in FIGS. 1*a* – 1*d*, 2*a*, 2*b* has no insulation shown over N+ region 15. In practice, insulation 12 extends on the surface of substrate 11 over region 15. Contact is made to region 15 through a window formed in insulation 12 in a manner well known in the semiconductor arts. In addition, electrode 13*a*, 13*b*, 13*c* and 13*d* can be covered by additional insulation, such as insulation 20 (FIG. 3). Insulation 20 might, for example, comprise a layer of silicon nitride.

While charge sink means comprises a region 15 of opposite conductivity type to that of substrate 11, any other structure capable of sinking charge can also be used in its place.

The structures and operating methods described above can be used in both CCD linear arrays and CCD area arrays. However, in an area array, the structure of this invention does require a larger chip and reduces the line resolution available.

It should be pointed out that all the structures described in this specification function with a buried channel as described in U.S. Pat. application Ser. No. 296,507 filed Oct. 10, 1972 now abandoned. However, buried channel is not required for proper operation.

P region 19 in FIG. 3 (formed by ion-implantation in one embodiment) has an impurity concentration of about $3 \times 10^{16}$ atoms/cc. In the same embodiment, P-type channel stop region 14 had an impurity concentration of about $10^{18}$–$10^{19}$ atoms/cc.

What is claimed is:

1. The method of operating a light sensitive element comprising a first region of semiconductor material overlaid by a first electrode, said light sensing element being capable of containing a charge packet and being part of a charge coupled device which comprises:

allowing charge accumulated in the light sensing element to transfer to a charge sink region by lowering the potential in a first intermediate region in the semiconductor material between said light sensing element and the charge sink region;

raising the potential in said first intermediate region of semiconductor material between said light sensing element and said charge sink region to a level selected to allow a given amount of charge to accumulate in said light sensing element and any additional charge formed in said light sensing element to transfer to said charge sink region;

transferring, at the end of a given time, the charge accumulated in said light sensing element to an adjacent region of semiconductor material by lowering the potential of said adjacent region of semiconductor material and the potential of a second intermediate region of semiconductor material between said adjacent region of semiconductor material and the light sensing element to levels beneath the potential of said light sensing element; and raising the potential of said second intermediate semiconductor material to a potential above the potential of said adjacent region of semiconductor material on the completion of the transfer of the charge accumulated in said light sensing element to said adjacent region of semiconductor material.

2. The method of claim 1 wherein the step of transferring, at the end of a given time, the charge accumulated in said light sensing element comprises raising the potential of said light sensing element and, at the same time, lowering the potentials of said adjacent region of semiconductor material and of a second intermediate region of semiconductor material between said adjacent region of semiconductor material and the light sensing element to levels beneath the potential of said light sensing element.

* * * * *